United States Patent Office 3,759,743
Patented Sept. 18, 1973

3,759,743
METHOD OF APPLYING COATINGS OF TIN OXIDE UPON TRANSPARENT SUBSTRATES
Andrew G. Menke, Toledo, Ohio, assignor to Libbey-Owens-Ford Company, Toledo, Ohio
No Drawing. Filed Sept. 17, 1971, Ser. No. 181,604
Int. Cl. H05b 33/23; H05k 3/00
U.S. Cl. 117—211                                      12 Claims

ABSTRACT OF THE DISCLOSURE

An improved technique for producing electrically conducting tin oxide films on the surface of a ceramic substrate by applying a solution of an organotin salt of trifluoroacetic acid to the substrate while it is at a temperature above 800° F.

This invention relates generally to an improved method for producing transparent, electrically conducting articles and more particularly to novel compositions useful for application to the heated surface of a ceramic base or substrate to form such articles.

It is well known that a transparent, electrically conductive film may be deposited upon a refractory base such as glass by heating the glass surface to an elevated temperature, for example above 800° F., but below the temperature at which the base becomes molten, and subjecting the heated glass to the action of various compounds of tin. Tin tetrachloride is one compound that has been used to a significant extent in this regard even though there are certain disadvantages inherent with its use. For example, it is believed that the presence of a chloride in the film-forming composition promotes high resistivity at the interface between an electrode applied to the surface of the substrate and the film formed by reacting stannic tetrachloride. This high resistance at the film-electrode interface is particularly high when the electrode is composed of silver frit. Further, the formation of hydrochloric acid vapors at the hot glass surface when employing tin tetrachloride often appears to cause a permanent cloud or haziness in the film. Such haze interferes with the optical clarity of the film and is particularly objectionable when the film is intended to be used in airplane windshields, optical viewing instruments, and similar locations where clarity of vision is a prime requisite.

It has been proposed to employ certain organic tin compounds in order to avoid the above difficulties. However, the use of organic tin compounds generally results in a reduction in specific conductivity of the film formed and a higher cost per unit of tin oxide in the resulting film.

Various methods have been suggested to permit the use of the cheaper inorganic compoundse such as tin tetrachloride rather than the more expensive organic tin compounds and produce higher conductivity tin oxide films but without the accompanying haze. Among such methods may be mentioned the application of a metal oxide sealer layer on the surface of the glass sheet prior to deposition of the transparent tin oxide coating, pickling treatments to reduce the alkali metal content of the glass surface, and complicated venting and exhaust procedures intended to immediately eliminate vapors formed upon contact of the spray solution with the sheet.

Thus, it has been necessary in the past either to provide a series of steps in the way of a preliminary treatment preparatory to the application of the stannic tetrachloride composition which forms highly conductive tin oxide films on contacting heated glass, or else to utilize a composition which does not contain a halogen compound thereby producing coatings having lower specific conductivity.

The present invention would appear to be somewhat at odds with the prior art in that it provides organic tin compositions capable of producing films having high conductivity and freedom from haze formation on the surface of a glass sheet. Thus, a method is provided which includes heating a glass sheet to an elevated temperature and applying to surface thereof a novel film-forming composition comprising a solution of certain organotin fluoroesters. In one of the most promising embodiments of the present invention, the compound employed is an organotin salt of trifluoroacetic acid.

Now, it has already been proposed to externally activate tin oxide film-forming organic and inorganic compounds by the addition thereto of fluorine or a fluorine-containing compound and/or chlorine or a chlorine-containing compound. Such external activation normally involves mixing the activator in solution together with the film-forming compound or, spraying the activator simultaneously with the spraying of the film-forming compound from a different spray gun so as to obtain maximum mixing. However, while such external activation is said to increase the conductivity of the resulting tin oxide coating, it has been necessary to utilize one of the previously mentioned surface treatments in order to produce a coating free from haze. Further, the external activation does not improve the rate of film formation or eliminate the occurrence of hot spots at the film bus bar interface.

The present invention provides a novel family of filming compositions and improved filming techniques that produce tin oxide films having high transparency, high electrical conductivity, good electrical contact with bus bars without additional operations in the vicinity of the interface to improve the electrical contact, improved rate of formation, and substantially no haze without requiring any of the surface treatments to improve the haze characteristics.

The compounds of the present invention are self-activating compounds in that the species believed to activate i.e., fluorine, is incorporated in the same molecule as the tin. More particularly, in accordance with the invention, a method is provided which comprises heating a substrate to a temperature in the range of from 800° F. to 1300° F., and applying to the heated surface a solution of a compound selected from the group having the general structural formula:

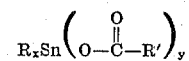

and

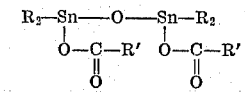

where R is an aliphatic or aromatic group and R' is a fluorocarbon of the structure, $C_nF_{2n+1}$, $n$ being a whole number, with $x$ having a value of 0 to 3 and $y$ having a value of 1 to 2, but at least 2 when $x=0$.

Glass sheets coated with tin oxide films formed by spraying compositions in accordance with the invention may be used as glazing closures of either laminated glass or of unlaminated, tempered glass. The coated surface may be grounded to serve as a static discharge. When spaced bus bars are employed with the coating and a voltage applied across the bus bars, current passes through the film. Thus, these structures may be used as vehicle viewing closures having defrosting and de-icing properties, transparent electroconductive coatings for cathode ray tubes, space heaters, electroluminescent panels and the like, and any other uses previously performed by transparent electroconductive metal or metal oxide coatings on glass and other ceramic materials.

The glass base or substrate to which the electrically conducting film is applied is normally soda-lime-silica glass, such as plate, float or sheet glass. However, films in accordance with the invention may be deposited on other refractory materials including various ceramics, glass-ceramics, porcelain, and other siliceous materials which melt at temperatures above approximately 900° F.

Examples of organic tin compounds which have been used successfully in accordance with the invention to produce excellent electrically conducting coatings include stannous trifluoroacetate, tributyltin trifluoroacetate, triphenyltin trifluoroacetate, 1,1,3,3-tetrabutyl 1,3-dirifluoroacetate distannoxane and the fluoroesters of heptafluorobutyric acid and pentafluoropropionic acid.

The invention will be understood more clearly with reference to the examples which follow which are offered by way of illustration only, and are not intended to define the breadth of the invention or limit the scope of the claims.

In all of the examples, transparent, haze-free films were obtained with no preliminary surface treatment, i.e., pickling, of the glass substrate. All of the samples were prepared by placing the spray gun (DeVilbiss Type P–AGA) 16 inches away from the substrate using a pot pressure of 15 p.s.i.g. and an atomizing pressure on the gun of 35 p.s.i.g.

EXAMPLE 1

Stannous trifluoroacetate was synthesized by heating a mixture of 40 grams (0.296 mole) of stannous oxide and 114 grams (1 mole) of trifluoroacetic acid under reflux conditions for a period of four hours under a nitrogen atmosphere. After filtering and distilling the excess trifluoroacetic acid under reduced pressure, a yellow syrup was obtained.

Thirty-eight grams of the resulting stannous trifluoroacetate was then dissolved in methyl ethyl ketone making 100 cc. of solution.

A piece of float glass 12 inches by 12 inches by 1/8 inch thick was provided along two opposite margins with thin strips of ceramic silver and then placed in a furnace heated to a temperature of 1250° F. for 115 seconds. The heating baked the ceramic silver strips to form bus bars fused to the glass surface. The sheet was then removed from the furnace and immediately conveyed past the spray gun with its bus bar containing surface facing same and uniformly sprayed with 68 cc. of the $Sn(CF_3COO)_2$ solution. The resulting filmed sheet was haze-free and had a surface resistivity of 32 ohms per square and an Illuminant "C" light transmittance of 76 percent.

Additional solutions of stannous trifluoroacetate were prepared as indicated above and sprayed on glass substrates 12 inches by 12 inches by 1/8 inch thick, heated and provided with bus bars as hereinbefore described. Higher rack speeds or speed of travel of the sheets past the spray gun, however, were employed with the following results:

| Volume of solution used (cc.) | Ohms/ square | Thickness (A.) | Illuminant "C" (percent) |
|---|---|---|---|
| 41 | 49 | 2,600 | 80 |
| 20 | 100 | 1,200 | 86 |

The films were haze-free and possessed excellent electrical contact with the bus bars at the interface.

The solutions in accordance with the invention described above give (1) higher light transmittances at the same resistances, and (2) better intrinsic resistivities than known prior art solutions.

EXAMPLE II

What is believed to be 1,1,3,3-tetrabutyl 1,3-ditrifluoroacetate distannoxane was synthesized by each of the following three methods:

(a) A mixture of 138 grams (0.39 mole) of dibutyltin diacetate and 100 grams (0.88 mole) of trifluoroacetic acid was heated under reflux for two hours. The acetic acid produced and the excess trifluoroacetic acid were removed by distillation under reduced pressure. The product was then recrystallized.

(b) A mixture of 49.2 grams (0.2 mole) of dibutyltin oxide and 23 grams (0.2 mole) of trifluoroacetic acid in 100 cc. of benzene was refluxed for 2 days with a Dean Stark extractor attached in which 2 cc. of water was collected. After removing all volatile constituents under reduced pressure the compound was recrystallized, yielding 52.4 grams of product.

The same reaction was repeated using a 1:2 and a 1:3 ratio of oxide to acid. In each case the same product was obtained.

(c) Twenty-five grams (.1 mole) of dibutyltin oxide and 50 grams (.24 mole) of trifluoroacetic anhydride were refluxed for 1 hour. After removal of excess anhydride the compound was recrystallized.

All of the above compounds as prepared in methods a, b and c were recrystallized from petroleum ether (30–60° C.) and shown to be the same from their infrared spectra. The molecular weight was determined to have an average value of 1245 with the melting point being approximately 168° C. to 170° C.

One hundred grams of the compound were then dissolved in methyl ethyl ketone and the solution brought to 200 cc.

Five pieces of float glass 12 inches by 12 inches by 1/8 inch were provided with thin strips of ceramic silver along two of their opposite margins and placed in a furnace heated to 1250° F. The sheets were removed from the furnace after 115 seconds of heating time, conveyed past the spray gun each at a different rack speed, and sprayed with the solution. All of the films formed were free from haze, possessed excellent electrical contact with the bus bar interfaces and showed the following resistances and transmittances:

| Volume of solution used (cc.) | Ohms/ square | Thickness (A.) | Illuminant "C" (percent) |
|---|---|---|---|
| 51 | 31 | 5,000 | 76 |
| 41 | 42 | 4,000 | 79 |
| 25 | 57 | 2,600 | 82 |
| 17 | 85 | 1,700 | 84 |
| 14 | 113 | 1,400 | 87 |

In order to determine the optimum concentration at which the spray solution should be used, various amounts of the compound were dissolved in methyl ethyl ketone thus obtaining solutions of different concentrations. The resistances obtained with these solutions were plotted versus the concentrations. These studies showed a continuous decrease in resistance with increasing concentration. For example, 0.65 gram of 1,1,3,3-tetrabutyl 1,3-ditrifluoroacetate distannoxane per cc. of methyl ethyl ketone gave a resistance of 49 ohms per square. The thickness of these samples was also plotted versus the concentration of the solutions. This plot showed that above 0.5 gram per cc., the curve changed in slope and flattened out and that above this concentration not much improvement in efficiency of film formation was obtained.

In general, satisfactory results have been obtained when using solutions containing as little as 2 percent by weight of an organotin fluoroester and as much as 70 percent by weight of such ester.

Studies were also performed using different temperatures which showed that an increase in thickness with a decrease in resistance was obtained with increasing temperatures. These studies were performed at furnace temperatures varying from 800° F. to 1350° F. in intervals of 50° F. At temperatures above 1350° F., the warpage of the glass was so severe that no meaningful data could be obtained. Taking all factors into account, a furnace temperature of 1250° F. is preferred even though at temperatures higher than 1250° F., a reduction in resistance was produced.

The efficiency of film formation and the intrinsic resistivity of the resulting tin oxide film can be varied somewhat by changing solvents or by including an amount of water in the solutions. Thus, for example, the use of methyl ethyl ketone as the solvent produces thicker films at the same rack speeds thus giving over-all lower resistances. However, with the use of methanol as a solvent with 1 percent water, a thinner film but a better conductor was obtained, that is, a film with a lower intrinsic resistivity was obtained. However, even though there are some differences with the use of the different solvents, the important values are still in the same order of magnitude whereby the solvent is not a particular critical feature of the invention. The use of methyl ethyl ketone is preferred due to the very high efficiency of film formation obtained with its use.

EXAMPLE III

Tributyltin trifluoroacetate was synthesized by refluxing 298 grams (0.5 mole) of bis(tributyltin) oxide and 114 grams (1 mole) of trifluoroacetic acid for 1 hour. The solution was then distilled under reduced pressure to remove the unreacted trifluoroacetic acid and water formed. The product obtained was recrystallized from petroleum ether (30–60° C.) yielding 200 grams and having a melting point of 63–64° C.

Eighty-eight grams of the tributyltin trifluoroacetate was dissolved in methyl ethyl ketone and the solution diluted to 200 cc.

A piece of float glass 12 inches by 12 inches by ⅛ inch was provided with the ceramic strips and heated in the furnace set to a temperature of 1250° F. for 115 seconds. The sheet was then removed and immediately sprayed with the tributyltin trifluoroacetate solution to a thickness of 1300 A. The resulting filmed sheet had a resistance of 65 ohms per square and an Illuminant "C" transmittance of 87 percent. The film was free from haze and had good electrical contact with the bus bar interfaces.

The above procedure was repeated except that the concentration of tributyltin trifluoroacetate was changed to 132 grams dissolved to the same volume with methyl ethyl ketone. The resulting filmed sheet had a resistance of 54 ohms per square, an Illuminant "C" transmittance of 84 percent, and a thickness of 1600 A. Comparison of these values with those obtained with the solutions of Examples I and II will show that the tributyltin trifluoroacetate gives a film with the best intrinsic resistivity.

EXAMPLES IV AND V

Fluoroesters of heptafluorobutyric and pentafluoropropionic acids were prepared by refluxing 1 mole of dibutyltin oxide with 2 moles of the respective acid for a period of 2 hours and then recrystallizing using the method hereinbefore described. Solutions were then made up as follows:

Solutions A and B—50 grams and 146 grams of the heptafluorobutyric ester, respectively, dissolved in methyl ethyl ketone and brought to a total volume of 200 cc.

Solutions C and D—82 grams and 122 grams of the pentafluoropropionic ester, respectively, dissolved in methyl ethyl ketone and brought to a total volume of 200 cc.

Four sheets of float glass 12 inches by 12 inches by ⅛ inch were each provided with thin strips of ceramic silver paste along two of their opposite margins and placed in a furnace heated to 1250° F. Each sheet was removed after 115 seconds, conveyed past the spray gun, and sprayed with a different one of the above solutions. The following results were obtained upon testing of the films:

| Solution | Ohms/square | Thickness (A.) | Illuminant "C" percent |
|---|---|---|---|
| A | 220 | 1,000 | 87 |
| B | 132 | 1,400 | 86 |
| C | 230 | 1,000 | 88 |
| D | 167 | 1,700 | 85 |

All of the films were haze-free and showed good electrical contact with the bus bars.

While the films formed from these compounds were satisfactory and possessed acceptable electrical and transmittance properties for certain applications, the above results show that the efficiency of film formation as compared, for example, to dibutyltin trifluoroacetate or other salts of trifluoroacetic acid, is decreased as the length of the fluorinated group is increased.

The use of the compounds in accordance with the present invention produce lower resistance, electrically conducting films with only a single pass through the furnace and spray, and without the necessity of pickling the glass than previously employed filming solutions. In addition, no special techniques are necessary to improve the film to bus bar contact such as the use of an air-dry or fired conducting frit overlay bridging the interface between the film and the bus bar. Also, in almost all instances, the glass can be tempered without the necessity of passing it through the furnace a second time thus eliminating warpage problems encountered when bent parts are used. Finally, the self-activated spray solutions also eliminate the problem of decomposition that currently exists with the presently used organic electrically conducting film forming solutions. Solutions made in accordance with this invention have been allowed to set for months with no sign of decomposition or precipitation.

I claim:

1. A method of producing a transparent electrically conducting film on a surface of a substrate, comprising heating said substrate to a temperature in the range of from 800° F. to 1300° F., and applying to the heated surface a solution of an organotin fluorester.

2. A method as claimed in claim 1, wherein said ester is an organotin salt of trifluoroacetic acid.

3. A method as claimed in claim 2, wherein the substrate is a soda-lime-silica glass and said surface is heated to a temperature of approximately 1250° F.

4. A method as claimed in claim 2, wherein said solution is applied to the surface by spraying while the substrate is conveyed past the source of spray.

5. A method as claimed in claim 2, wherein said ester is stannous trifluoroacetate.

6. A method of producing a transparent electrically conducting film on a surface of a substrate, comprising heating said substrate to a temperature in the range of from 800° F. to 1300° F., and applying to the heated surface a solution of a compound selected from the group having the general structural formula:

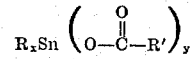

and

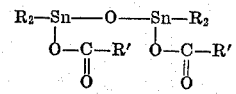

where R is an aliphatic or aromatic group and R' is a fluorocarbon of the structure, $C_nF_{2n+1}$, $n$ being a whole number, with $x$ having a value of 0 to 3 and $y$ having a value of 1 to 2, but at least 2 when $x=0$.

7. A film-forming composition, consisting essentially of from 2 percent to 70 percent by weight of an organotin salt of trifluoroacetic acid and from 30 percent to 98 percent by weight of a solvent for said salt.

8. A film-forming composition as claimed in claim 7 wherein said solvent is methyl ethyl ketone.

9. A film-forming composition as claimed in claim 7, wherein said organotin salt is stannous trifluoroacetate.

10. A film-forming composition as claimed in claim 7, wherein said organotin salt is 1,1,3,3-tetrabutyl 1,3-ditrifluoroacetate distannoxane.

11. A film-forming composition as claimed in claim 10, wherein said solvent is methyl ethyl ketone and the concentration of the solution is approximately 0.5 gram of the salt per cc. of solvent.

12. A film-forming composition consisting essentially of from 2 percent to 70 percent by weight of a compound selected from the group having the general structural formula:

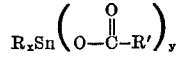

and

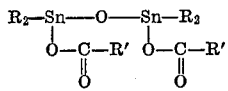

where R is an aliphatic or aromatic group and R' is a fluorocarbon of the structure, $C_nF_{2n+1}$, $n$ being a whole number, with $x$ having a value of 0 to 3 and $y$ having a value of 1 to 2, but at least 2 when $x=0$, and from 30 percent to 98 percent by weight of a solvent for said compound.

References Cited
UNITED STATES PATENTS

| | | | |
|---|---|---|---|
| 2,566,346 | 9/1951 | Lytle et al. | 117—211 |
| 3,107,177 | 10/1963 | Saunders et al. | 117—211 |
| 2,849,339 | 8/1958 | Jaffe | 117—211 |
| 3,108,019 | 10/1963 | Davis | 117—211 |
| 3,019,136 | 1/1962 | Aufferdorde | 117—211 |
| 2,971,867 | 2/1961 | Lytle | 117—211 |

ALFRED L. LEAVITT, Primary Examiner

M. F. ESPOSITO, Assistant Examiner

U.S. Cl. X.R.

117—124 B, 124 D; 260—429.7